United States Patent [19]

Beall

[11] Patent Number: 4,983,453
[45] Date of Patent: Jan. 8, 1991

[54] HYBRID PULTRUDED PRODUCTS AND METHOD FOR THEIR MANUFACTURE

[75] Inventor: Frank C. Beall, Puyallup, Wash.

[73] Assignee: Weyerhaeuser Company, Tacoma, Wash.

[21] Appl. No.: 462,300

[22] Filed: Jan. 2, 1990

Related U.S. Application Data

[63] Continuation-in-part of Ser. No. 93,323, Sep. 4, 1987, abandoned.

[51] Int. Cl.$^5$ .......................... B32B 5/28; B32B 29/02
[52] U.S. Cl. .................................... 428/294; 428/284; 428/285; 156/179; 156/307.3; 156/307.7
[58] Field of Search ............... 428/284, 285, 294, 295; 156/179, 242, 307.3, 307.7

[56] References Cited

U.S. PATENT DOCUMENTS

| | | | |
|---|---|---|---|
| 3,248,467 | 4/1966 | Gehr | 264/259 |
| 3,361,690 | 1/1968 | Gregory et al. | 524/16 |
| 3,470,051 | 9/1969 | Meyer | 264/174 |
| 4,028,477 | 6/1977 | Goppel et al. | 428/285 |
| 4,207,129 | 6/1980 | Tadewald | 156/242 |
| 4,252,696 | 2/1981 | McQuarrie | 524/39 |
| 4,495,017 | 1/1985 | Abe et al. | 156/181 |
| 4,541,884 | 9/1985 | Cogswell et al. | 156/166 |
| 4,749,613 | 6/1988 | Yamada et al. | 428/294 |
| 4,752,513 | 6/1988 | Rau et al. | 428/294 |
| 4,812,343 | 3/1989 | Kiekhaefer et al. | 428/35.6 |
| 4,822,826 | 4/1989 | Pommier et al. | 521/84.1 |

FOREIGN PATENT DOCUMENTS

| | | |
|---|---|---|
| 1129580 | 8/1982 | Canada. |
| 2836418 | 2/1980 | Fed. Rep. of Germany. |
| 2391067 | 12/1978 | France. |
| 2471268 | 6/1981 | France. |
| 0017245 | 2/1981 | Japan. |

OTHER PUBLICATIONS

"Designing Thermostat Shapes for Pultrusion," Machine Design, vol. 43, No. 31, 12-23-71, J. Comey.
Martin, J. D. 1986, Pultrusion and Pulforming, *Modern Plastics Encyclopedia*, pp. 317-318, McGraw14 Hill, New York.

*Primary Examiner*—George F. Lesmes
*Assistant Examiner*—Christopher Brown

[57] ABSTRACT

The present invention is a composite pultruded product and the method for its manufacture. The product is made with a plurality of longitudinal glass roving strands. In addition, a cellulosic mat is used in association with the roving. The mat serves as a filler, or reinforcing filler, to ensure uniform resin distribution within the product even when the glass content is significantly reduced. The method can be carried out on convention pultrusion equipment with little or no modification. The cellulose fiber mats may be either air laid or wet laid and should have an ultimate moisture of 3% or less before being incorporated into the pultruded product.

21 Claims, 2 Drawing Sheets

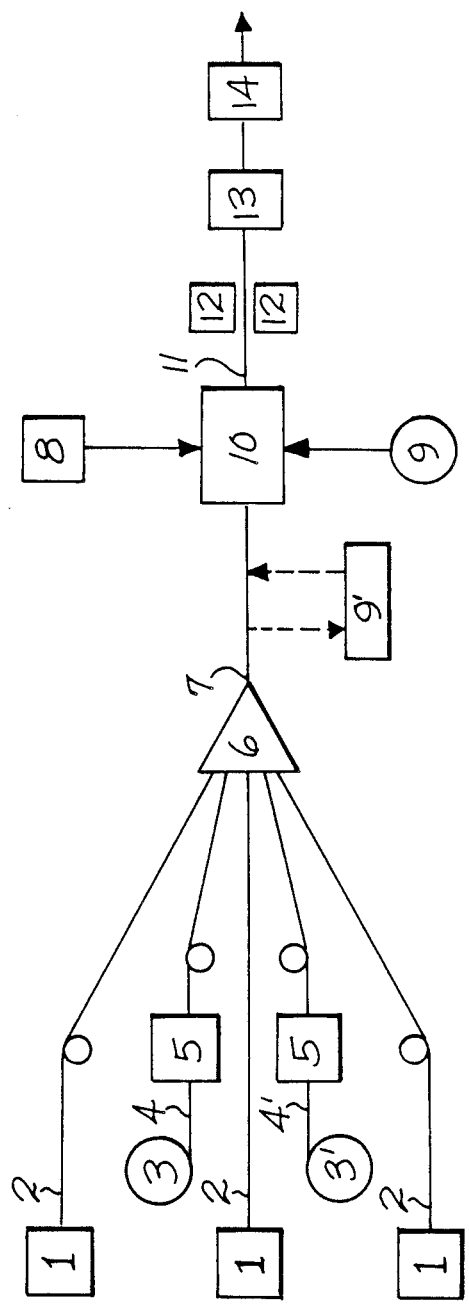

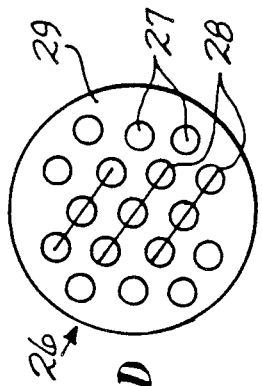
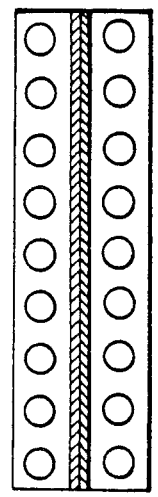
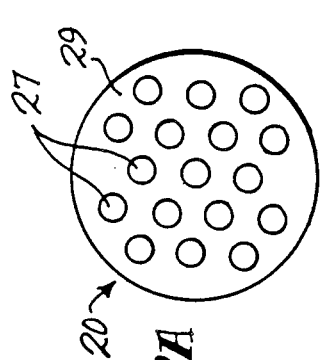
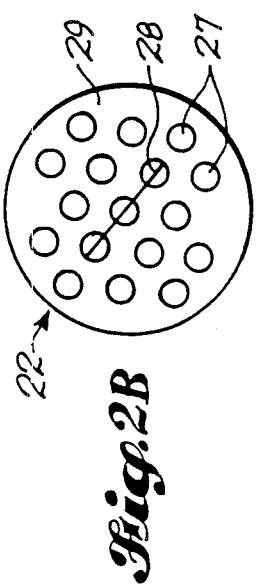
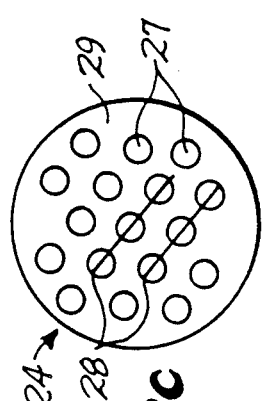

HYBRID PULTRUDED PRODUCTS AND METHOD FOR THEIR MANUFACTURE

This application is a continuation-in-part of application Ser. No. 093,323, filed Sept. 4, 1987 and now abandoned.

BACKGROUND OF THE INVENTION

The present invention comprises a pultruded product which contains, in addition to the usual glass roving strands, a cellulosic mat which serves as a filler or reinforcing filler. The invention further comprises a method for making products of the above type.

Pultrusion is a process for continuously forming reinforced plastic materials having a uniform cross-sectional profile. The word "pultrusion" is a hybrid which combines the words "pull" and "extrusion". The product is literally pulled through a forming die. In its most usual form, pultrusion involves feeding a multiplicity of fiberglass roving strands, with or without additional plies of glass mat of appropriate width, into a pultrusion die. A resin, normally a thermosetting material such as a polyester, is injected into the die where it is uniformly distributed among the reinforcing materials. Alternatively, the reinforcing material may be drawn through a resin bath prior to entry into the die. The die itself is heated. As the product is drawn from the die, the resin is either cured, or very nearly cured. The endless product so formed is then cut to appropriate length. Many variations of this general process have been developed as the technology has matured.

Pultruded products are used in a great variety of applications. In many places they have replaced metallic construction materials, particularly those used in highly corrosive environments. Structural beams, floor gratings, handrails, ladders, and many similar products are now made by a pultrusion process.

A general background on pultrusion is found in an article by Martin, *Modern Plastics Encyclopedia*, pp. 317-318, McGraw-Hill, Inc., New York (1986). Another good background discussion is found in U.S. Pat. No. 4,252,696 issued to McQuarrie.

Despite the enormous versatility of the pultrusion method and the many variations which have been developed around it, it still has limitations. In many cases it is necessary to overdesign products in order to ensure uniform distribution of the glass reinforcement within the resin matrix. Products with low glass content tend to show areas of resin separation in which the reinforcing material may be completely absent. This resin separation is apt to occur even when high concentrations of mineral fillers are used with the resin. Pultruded products also tend to have relatively high density in comparsion to many other plastic composites. This results in a relatively high cost per unit volume of the finished product. Further, because of the problem of resin separation at low reinforcing fiber contents, it is very difficult to make products less than about three millimeters in thickness, even though they may not be required to have high strengths. While some attempts have been made in the prior art to address these deficiencies, none have been particularly successful to the present time.

Reference might be made at this point to a number of patents of general pertinence to the present invention. Cogswell et al, U.S. Pat. No. 4,541,884, describe pulling a continuous tow or roving of fibers through a mixture of a thermoplastic polymer and a volatile plasticizer. The presence of the plasticizer reduces the melt viscosity to the point that uniform impregnation of the reinforcing fibers is possible. After forming the product, the plasticizer is volatilized. The invention suggest that glass fiber, carbon fiber, jute and high modulus synthetic polymer fibers can be used for reinforcing. However, the reinforcing must have sufficient longitudinal strength to enable it to be drawn through the viscous impregnation bath. The inventors further note that at least 50% by volume of the fibers must be aligned in the direction of draw.

Goppel et al, U.S. Pat. No. 4,028,477, make a pultruded product by first taking an open cell foamed core material and impregnating it with a thermosetting resin. The impregnated foam core is faced on one or both sides with a resin free fibrous reinforcing layer. The assembly is then molded in a pultrusion die where the resin flows from the foam into the reinforcement. The foam core is ultimately totally collapsed in the process. Cellulosic paper, cotton fabric, asbestos, nylon, and glass are disclosed as reinforcing materials.

Tadewald, in U.S. Pat. No. 4,207,129, describes a pultruded product which is a conductive or semi-conductive sheet. As a first step in its manufacture, a resin is admixed with a semiconductive powder, such as acetylene black, and a refractory inorganic oxide. This mixture is impregnated into a supporting material which may include a heavy absorptive paper about 0.020 inches in thickness. The resin in the impregnated product is then B-staged. At this time conductive elements such as copper foil strips may be included. The B-stage material is then encapsulated with glass rovings and/or scrim and further impregnated with a polyester resin in a conventional pultrusion process.

Cellulosic materials have found very little use in any capacity in reinforced plastic materials based on polyester resins. They have had a long standing reputation, not without some justification, for causing soft cures and tacky surfaces. This has been particularly true for products based on wood fiber which have not been chemically modified. Gregory et al, in U.S. Pat. No. 3,361,690, describe the use of Douglas-fir bark fiber as a reinforcing material for polyester-based bulk molding compounds. Gehr, in U.S. Pat. No. 3,248,467, describes the use of similar compounds in melamine overlaid reinforced plastic moldings. However, the bark fiber products appear to be an exception to the problems encountered with other cellulose based materials.

Purified cellulose has found widespread use in thermosetting resins such as impregnated phenolic and melamine laminates and molding conpounds. However, it has not been generally regarded as useful in pultruded products. A few applications using helical wound paper have appeared in the paten literature. Japanese patent application No. 56-17245 describes the use of a low density (ca. 0.7 g/cc or lower) paper tube which serves as a permanent mandrel for a pultruded cylindrical shape. The resin and glass composite surrounding the tube is bonded only to the surface and the tube itself is not impregnated with resin.

French patent application No. 2,391,067 teaches the use of a plurality of reinforcing fiber bundles, each of which is wrapped with a barrier material that can be paper. These may then be used in pultruded or extruded products. The barrier material serves to prevent passage of resin into the reinforcing fiber bundles. The application notes that it is important that the resin not impregnate the barrier layer to any extent.

Meyer, In U.S. Pat. No. 3,470,051, describes a relatively complex helically wound product that is preformed and then used as a core for pultruded products such as arrow shafts. The preform has a double layer of paper, then a layer of glass, and finally another layer of paper. This is then coated with resin and molded into a rod before use in the pultrusion process.

An early article describing the pultrusion process (*Machine Design*, 43, Dec. 26, 1971, pp. 45–49) speculates that any material that can be fed from a coil is a "possibility" for use in the pultrusion process. Paper products, along with a host of other materials, are suggested as being potentially useful.

In none of these cases is a cellulose-based material completely resin saturated and copultruded with a reinforcing material such as glass rovings. Surprisingly, the present inventor has found that cellulose-based mats can be successfully used in pultruded products made with a wide variety of impregnating resins. Apparently the present success has been due in great part to the fact that it has been found critical to maintain a moisture content no greater than about 3% in the cellulosic product if voids and blistering are to be avoided.

SUMMARY OF THE INVENTION

The present invention comprises a method of making a composite pultruded product and the product resulting form the use of the process. The product contains a plurality of longitudinally oriented, essentially parallel glass roving strands in association with a cellulosic mat. Both the roving strands and the cellulosic mat are completely encased within a resin matrix. The glass roving strands comprise from 10–45%, the cellulosic mat between 5 and 40%, and the resin 40–70% of the product, all measured by volume.

The cellulosic mat serves as a filler or reinforcing filler to help maintain uniform resin distribution within the product. This mat will typically be formed of short fibers having a length distribution within the range of about 1–10 mm, more typically about 1–3 mm.

The furnish of the cellulosic mat can be selected from, thermomechanical pulps, and chemical pulps such as those made by the kraft or sulphite process. Defibered whole wood mats are also suitable with some resin systems. The mats can be formed from the fibers using conventional wet or dry processes. It is within the scope of the invention to include up to about 20% by weight of noncellulosic fibers in the mat. These fibers include glass fibers or polyolefin fibers such as polyethylene of polypropylene, of mixtures of any of these.

It is a critical aspect of the invention that prior to forming the pultruded product, the cellulosic mat should be dried to a maximum of about 3% moisture content. The absorbtivity of the cellulosic mat should be such that it can be readily impregnated with resin by passing through a bath of resin. This may include an operation such as passing the resin dipped mat through a set of opposed rolls and lightly pressing to aid impregnation and doctor off excessive resin.

The resin matrix of the product may be chosen from thermosetting or thermoplastic resins. In the case of thermosetting resins these will usually chosen from unsaturated polyester, epoxy, methacrylate, or phenolic types. Where thermoplastic resins are used, they may be either polyethlene or polypropylene, acrylonitrile-butadiene-styrene, acetal, polyamide, polyimide, and polyester. Other types of thermoplastic resins may also be wed. Mixtures of thermosetting and thermoplastic resins are also acceptable.

The process may be either a conventional pultrusion type or a pulforming type in which a thermosetting resin matrix is only partially cured within the pultrusion die. Further curing of the pultruded product is carried out in a second die. It should be considered within the scope of the invention to use the pulforming process with a thermoplastic resin, a thermosetting type, or mixtures of the two.

The method further includes preimpregnating the cellulosic mat with resin prior to incorporation with the glass roving strands in the pultrusion die. The matrix resin may be added to the glass roving and cellulosic mat either in the pultrusion die itself or in an open bath prior to the pultrusion die.

The product may include glass mats as wells as glass roving and it is within the scope of the process to support the cellulosic mat on a glass fiber mat or between glass fiber mats as it is supplied to the pultrusion die.

It is an object of the present invention to provide a novel pultruded product.

It is another object of the invention to provide a pultrusion process which includes feeding a cellulose-based mat along with glass reinforcing roving.

It is another object to provide a glass pultrusion process and resulting product which may have relatively lower glass content while maintaining uniform resin distribution.

These and many other objects will become readily apparent to those skilled in the art upon reading the following detailed description taken in conjunction with the drawings.

BRIEF DESCRIPTION OF THE DRAWINGS

FIG. 1 is a diagrammatic representation of the major elements of the present pultrusion process.

FIGS. 2A–D show representative cross-sectional views of a pultruded rod.

FIG. 3 shows a cross-sectional representation of a flat pultruded product.

DESCRIPTION OF THE PREFERRED EMBODIMENTS

Conventional pultruded products normally consist of a resin matrix, typically a polyester resin, and glass reinforcing fibers. The reinforcing fibers are usually present as roving but the product may contain glass mat as well. The roving provides longitudinal strength for both the process and the product, whereas the mat provides a measure of transverse strength. The percentage of glass fiber in most pultruded products ranges from 50–70% by weight or about 35–55% by volume. Pultruded products have a relatively high density, usually in the range of about 1700 kg/m$^3$.

In the present invention a cellulosic mat is used in addition to, or to substitute for, some of the glass fiber, creating a hybrid product. The use of the cellulosic mat can reduce density and cost of the product. It also enables the production of products having relatively lower percentages of glass than can now be made with good uniformity.

In many cases thin panels, in the range of about 3 mm thick, must be substantially over-designed in the glass fiber compound because it is not practical to pultrude through thinner dies. However, if the glass fiber content is reduced, resin rich areas may form which have poor physical properties and, additionally, may cause jamming in the die. The addition of the low density cellulosic mat can maintain composition integrity and provides a means of reducing the fiberglass content while overcoming the before-mentioned limitations.

The cellulosic mat may be formed as an air laid felt or it may be made as a wet laid product as, for example, on a conventional paper machine. If made as a air laid felt, the mat will normally be precompressed to reduce bulk and improve strength and handing characteristics. The mat may include up to 20% by weight of a noncellulosic fiber such as glass or polyolefin. However they are prepared, the mats must be dried to a low moisture content, in the range of 3% moisture or below, prior to inclusion in the pultruded product. The ability of the mats to readily absorb or imbibe resin is essential. In general, this is not a problem with air laid mats. However, wet formed mats such as pulp products should generally have a density of no more than about 0.45 g/cc with little or no refining prior to wet forming. So-called dissolving pulps are normally useful. In particular, high bulk pulps such as prehydrolyzed, cold caustic extracted kraft pulps are very satisfactory. Basis weight may vary over a wide range but generally will fall between about 100–800 g/m$^2$, more typically about 300–600 g/m$^2$.

FIG. 1 is representative of the pultrusion process of the present invention. A fiberglass roving supply 1 is maintained in a conventional creel. A sufficient number of roving strands 2 are drawn from the creels into a preformer 6. The appropriate form of cellulosic mat is supplied as rolls 3, 3' from which the mat 4, 4' is led through dryers 5 to preformer 6. This is termed parallel feeding or orientation to distinguish it from those processes and products excluded form the present invention in which a paper product is used as or included in a core material around which other materials are pultruded but which is not itself impregnated with resin during the pultrusion process. The core products just noted may include those formed by helical winding, such as paper tubes. The preformed raw material 7 is then directed to the pultrusion die 10. An appropriate resin, usually a filled polyester, is supplied to the die by pump 9. The die will normally have electrical heaters which are connected to an electrical supply 8. The cured pultruded profile 11 is drawn from the die by pullers 12 to a cutoff saw 13.

Alternatively one or more of the rovings or mats supplied to the pultrusion die may be preimpregnated with resin in bath 9'. Bath 9' may be located either before of after former 6. The product may also be post formed in a die 14, as in a pulforming process. The post forming die 14 will usually be heated and may be incorporated in the puller mechanism 12 or may be separate, as is shown in the drawing.

It should be considered within the scope of the invention to carry the fiber mat into the pultruson dies supported on a glass or other type mat. Thus, in FIG. 1, mat 4 might be cellulose fiber and mat 4' glass roving.

EXAMPLE 1

A cellulosic mat having a 400 g/m$^2$ basis weight, a density of about 60 kg/m$^3$ and a thickness between 6 and 7 mm was cut into strips 12 mm wide. The mat was a standard Euro Hospital product No. 001.400. This is comprised of an air laid bleached softwood pulp fiber supported on a single tissue layer and containing approximately 20% Pulpex polyolefin fiber. Pulpex is a trademark of Hercules, Inc., Wilmington, Del. The mat was supplied by Dry-Formed Processes, A. B., Öerkelljunga, Sweden. The pultrusion die, which produced a 9.7 mm diameter rod, was initially strung with 17 strands of E-glass roving weighting 5 g/m. The trials were run by removing strands of roving and substituting strips of cellulose mat in the sequence shown in the following table. The resin was a standard pultrusion grade polyester obtained from Nordic Supply, Aalesund, Norway.

The products made are represented in FIG. 2 where rods generally indicated at 20, 22, 24 and 26 were made respectively with 0, 1, 2, and 3 strips of cellulosic mat. The glass fiber rovings are indicated at 27 within the resin matrix 29. The cellulosic mat strips 28 were positioned approximately as is shown in the drawing.

TABLE 1

| Glass Roving Strands | Cellulosic Mat Strips | Pultruded Glass/Cellulosic Mat Reinforced Rod | | | | | | |
|---|---|---|---|---|---|---|---|---|
| | | Volume % | | | Product Density kg/m$^3$ | Modulus of Elasticity GPa | Modulus of Rupture MPa | Impact Strength J |
| | | Glass | Cellulose | Resin | | | | |
| 17 | 0 | 44 | 0 | 56 | 1,700 | 31.5 | 752 | 25 |
| 14 | 1 | 36 | 12 | 51 | 1,580 | 26.0 | 582 | 20 |
| 11 | 2 | 29 | 16 | 55 | 1,480 | 29.2 | 603 | 16 |
| 11 | 3 | 29 | 26 | 45 | 1,440 | 18.4 | 371 | 17 |
| 8 | 3 | 21 | 28 | 51 | 1,310 | 19.7 | 428 | 13 |
| 8 | 4 | 21 | 27 | 52 | 1,370 | 18.3 | 380 | 5.7 |

While the higher usages of cellulose mat result in a significant reduction in strength, a major reduction in product density is also achieved. This effects a significant cost reduction in a product where the high strength were not required.

EXAMPLE 2

In this example a flat pultruded product was made having a cross section 8×150 mm. This product was normally made with 39% glass roving, 16% glass mat in two layers, and 45% resin, all measured by volume. The roving was E-glass having a weight of 5 g/m as was used in the previous example. The glass mats each had a basis weight of 1050 g/m$^2$.

Two types of cellulosic mat and two types of resin were used in making the products of the example. The first cellulosic mat was a Euro Hospital mat as described above. The other was air laid from mechanically defibered Douglas-fir mixed with 15% Pulpex E polyethylene fibers and formed to a 400 g/m$^2$ basis weight. This mat had a density of about 67 kg/m$^2$ and a thickness of 6 mm.

The fiber mats were cut into strips 150 mm wide by 600 mm long. The glass was distributed with roving top and bottom and cellulosic mats in the center, as shown in FIG. 3. Here the flat profiled product 30 has glass roving 32 at top and bottom and two cellulosic mats 34 within a resin matrix 36. For the test, after achieving steady-state operation with the conventional materials, the glass mats were cut and substituted with the fiber mats on a one-to-one basis. The fiber mats were previously dried to a moisture content below 1%. The volumetric contribution of the cellulosic mats to the ultimate product was about the same as that of the original glass roving.

A first set of trials with the two types of cellulosic mat was carried out with the polyester resin described in the previous example. A second set of trials was then made using a phenolic resin. The resin employed was Norsophen 1701 used with catalyst 3100. These products are available form CdF Chimie North America, Inc., Larchmont, N.Y.

The products made with both types of cellulosic mat and with both resins were excellent in appearance. The cellulosic mats fed into the pultrusion die smoothly and with no tendency to jamming. There was no evidence of blistering, delamination, or incomplete cure in any of the pultruded products.

Having thus described the best mode known to the inventor of practicing his invention, it will be readily apparent to those skilled in the art that many variations can be made form the described example without departing from the spirit of the invention. Thus, the invention is to be considered as being limited only by the following claims.

I claim:

1. A composite pultruded product consisting essentially of a plurality of longitudinally oriented essentially parallel glass roving strands; and a parallel oriented cellulosic mat interlayered between the roving strands, both the roving strands said cellulosic mat having a moisture content of 3% or less, and cellulosic mat being completely saturated with and enclosed within a resin matrix, wherein the glass roving strands comprise from 10–45%, the cellulosic mat from 4–40%, and the resin 40–70 % of the product, all measured by volume.

2. The product of claim 1 in which the cellulosic mat is air laid prior to incorporation into the product.

3. The product of claim 1 in which the cellulosic mat is wet formed and dried prior to incorporation into the product.

4. The product of claim 1 in which the cellulosic mat is selected from defibered wood, thermomechanical pulps, chemical pulps, and mixtures thereof.

5. The product of claim 1 in which the cellulosic mat is combined with up to 20% by weight of noncellulosic fibers.

6. The product of claim 5 in which the noncellulosic fibers are selected from polyolefin fibers, glass fibers, and mixtures thereof.

7. The product of claim 1 in which the resin matrix is a thermosetting resin.

8. The product of claim 7 in which the resin matrix is selected from polyester, epoxy, methylacrylate, and phenolic resins.

9. The product of claim 1 in which the resin matrix is a thermoplastic resin.

10. The product of claim 9 in which the resin matrix is selected from the group consisting of polyethylene, polypropylene, acrylonitrile-butadiene-styrene, acetal, polyamide, polyimide, and polyester resins, and mixtures thereof.

11. The product of claim 1 in which the resin matrix is a mixture of thermosetting and thermoplastic resins.

12. The product of claim 1 which further contains up to 25% by volume of a glass fiber mat.

13. A method of making a composite pultruded product which comprises:
providing a heated pultrusion die;
supplying a plurality of essentially parallel continuous glass roving reinforcing strands to the die;
further supplying in parallel a cellulosic mat to the die, said mat having a density no greater than about 0.45 g/cc and a basis weight in the range of about 100–600 g/m$^2$;
drying said cellulosic mat to a moisture content of 3% or less;
impregnating the roving and dried cellulosic mat with a thermosetting resin;
supporting said cellulosic mat on and enclosing said cellulosic mat within said roving strands; and
drawing the impregnated materials through the heated die to form a pultruded product whereby the cellulosic mat reduces the density of the product while serving to maintain uniform resin distribution throughout the pultruded product.

14. The method of claim 13 wherein the resin is a thermosetting type which is essentially fully cured in the die.

15. The method of claim 13 wherein the resin is a thermosetting type which is only partially curd, within the pultrusion die and further curing the pultruded product in a second die.

16. The method of claim 13 wherein the resin is a thermoplastic type.

17. The method of claim 16 in which the pultruded product is post formed in a second die.

18. The method of claim 13 which includes preimpregnating the cellulosic mat with resin prior to incorporation with the glass roving strands.

19. The method of claim 13 which includes impregnating the roving and cellulosic mat with resin in the pultrusion die.

20. The method of claim 13 which includes impregnating the roving and cellulosic mat with resin in an open bath prior to the pultrusion die.

21. The method of claim 13 which further includes supporting the cellulosic mat on a glass fiber mat as it is supplied to the pultrusion die.

* * * * *